Sept. 8, 1925.
L. C. HOLLOMAN
1,553,044
HARROW
Filed Aug. 18, 1924
2 Sheets-Sheet 2
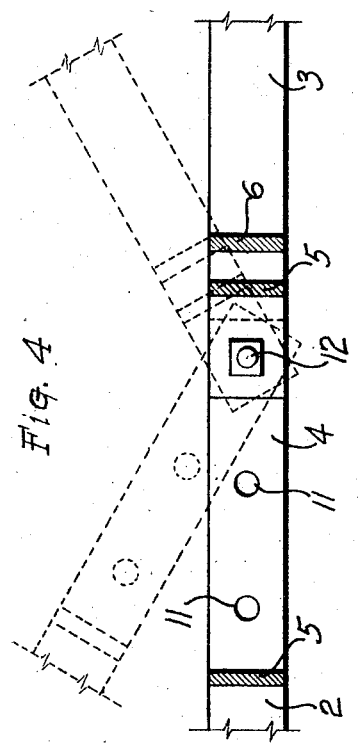
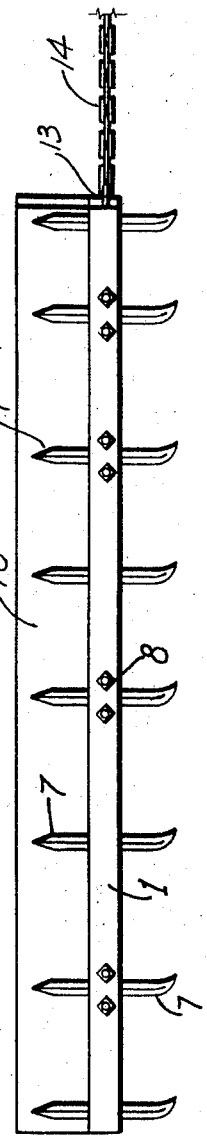
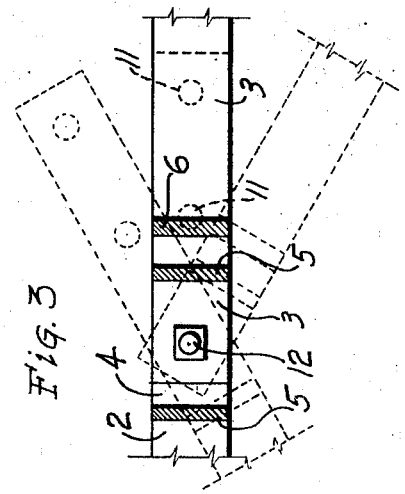
INVENTOR
Leonidas C. Holloman Patented Sept. 8, 1925.

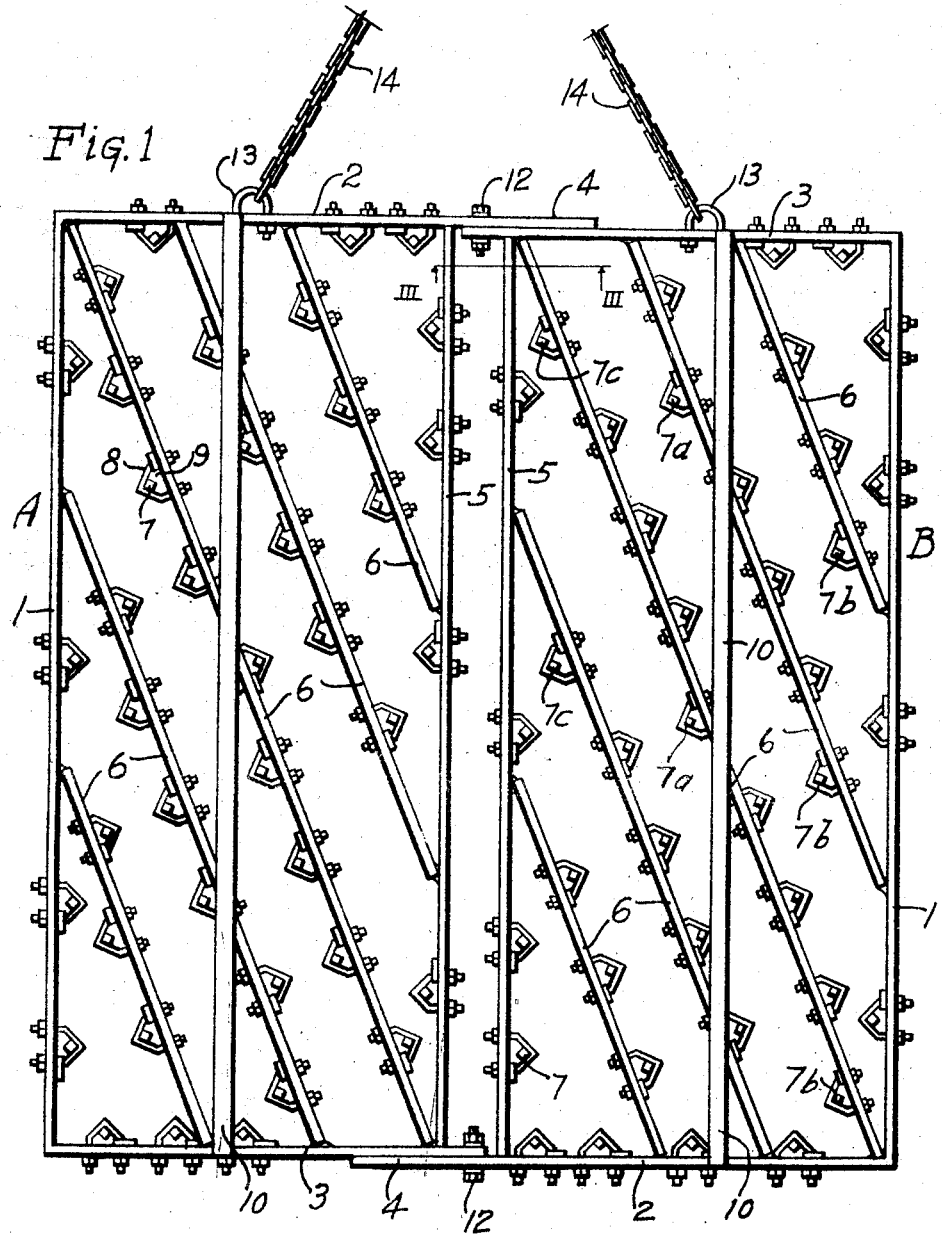

1,553,044

UNITED STATES PATENT OFFICE.

LEONIDAS C. HOLLOMAN, OF MEMPHIS, TENNESSEE.

HARROW.

Application filed August 18, 1924. Serial No. 732,737.

*To all whom it may concern:*

Be it known that I, LEONIDAS C. HOLLO-MAN, a citizen of the United States, residing at Memphis, county of Shelby, and State of Tennessee, have invented certain new and useful Improvements in Harrows, of which the following is a full, clear, and exact description, such as will enable anyone skilled in the art to make and use the same.

My invention relates to harrows more especially designed to be used as cultivators between the rows of growing plants.

In planting many forms of crops, parallel ridges or rows are thrown up leaving a furrow or valley therebetween. This harrow is designed with the primary object of being used to cultivate and pulverize the surface of the ground of these rows and furrows. In furtherance of this, when the rows are first thrown up, it is desirable that the harrow should straddle the row itself, cultivating both sides thereof and also that it may be run between the rows and will conform itself to the furrows. After the plants have started growing, further cultivation is necessarily confined to the furrows. In addition crops are sometimes planted in rows on a flat surface and it is desirable that the harrow take care of this condition also.

With these conditions in view the objects of my invention are; to provide a harrow which will conform itself to the row or to the furrow or which will lie on a flat surface; to make such a harrow which may be adjusted for varying spacing of rows; and finally, to make such a harrow which is rigid yet simple in construction.

I accomplish these objects as will be more fully hereinafter set out in the drawings, specification and claims.

Primarily this harrow consists of two rectangular sections preferably identical in form adjustably hinged together in the middle and provided with weighting means which may be shifted to predetermined locations, namely, near the outer sides of the sections to make the harrow conform to a ridge; near the inner sides of the sections to make the harrow conform to the valley between the ridges; and to a more or less longitudinally central location between the sides of each section, to cause the harrow to ride evenly on a flat surface.

In the drawings:

Fig. 1 is a plan view of the preferred form of my harrow showing the same in its narrowest form.

Fig. 2 is a side elevation of the harrow, showing only a limited number however of the teeth and showing the side view of the weight.

Fig. 3 is a fragmentary sectional elevation taken on the line III—III of Fig. 1 looking in the direction of the arrows showing the hinge for the harrow.

Fig. 4 is an identical sectional elevation showing the harrow sections spaced at their greatest distance apart. The dotted lines in these sections showing in Fig. 3, the hinge action when the harrow is conforming itself to a ridge and in Fig. 4 the same action when the harrow is conforming itself to a furrow.

Referring now to the drawings, the harrow comprises two identical sections A and B each of these sections preferably being made of a rectangular bar bent in the form of a U with sharp corners, the bottom 1 of the U forming the outer side, and the legs 2 and 3 respectively bent at right angles thereto forming the ends of the section, the end 2 being longer than the end 3 by virtue of an extended portion 4. Each of these sections is completed by a straight bar 5 substantially parallel with the outer side 1, which bar forms the inner side of the section, these two bars forming the section frame. Lying within this frame are a number of parallel bars 6 diagonally disposed. One of these diagonal bars preferably extends from an inner corner to an opposite outer corner and the others are parallel thereto and evenly disposed on each side thereof. The frame may be bolted or riveted together and the diagonal bars similarly fastened, but I prefer to build the entire structure up by spot welding the diagonals to the frame members and by welding the inner side to the end members of the frame.

The teeth 7 are secured to the frame members and the diagonals by U-shaped clips 8, which clips clamp the teeth against filler blocks 9 shaped to conform to the tooth. The teeth 9 are preferably spaced as evenly as possible over the width of the sections so that thorough cultivation may be had over the entire area. In order however that a space may be had to receive a weight which is preferably in the form of a bar 10, two of the teeth which I have designated as 7ª lying near the longitudinal center line of the section have been displaced from their normal positions on the diagonal bars in order that a longitudinal space may be formed which will receive the weight 10 in the location shown in Fig. 1. Similarly, the teeth 7ᵇ have been displaced in order to form a longitudinal space near the outer edge of the section and the teeth 7ᶜ have been displaced in order that a longitudinal spacing for the weight be formed near the inner edge of each harrow section.

To form a hinge the short bar 3 forming one end of each section extends slightly beyond the inner bar 5 and the extension 4 on the inner part of the bar 2 forming the other end of each section projects a greater distance beyond this same inner bar 5. When the two sections are assembled to form a harrow, the extension 4 of section B is brought outside of the end 3 of section A so that it overlaps the end 3. The extensions 4 of both sections are each provided with a number of holes 11 three of which have been shown for the purpose of illustration in these drawings. Through one of these holes of each a bolt 12 is shown, which bolt also passes through a corresponding hole in the end 3 of the opposite section. When assembled as shown in Fig. 1 and in the detail Fig. 3 the two sections of the harrow are hinged as closely together as possible and therefore the harrow is as narrow as it can be made. Should it be desired to make the harrow wider, the bolts 12 are removed, the sections moved apart and the bolts again inserted through the holes in the end members 3 and through corresponding ones of the other holes 11 in the extensions 4 of the opposite sections. Fig. 4 shows these fully extended and the harrow when the bolts are in these outer holes, would be the greatest possible width.

In ordinary use two sections make up a complete harrow. If the rows be narrow, the bolts 12 are placed so as to hinge the sections as closely as possible together. If the rows be far apart the bolt location is shifted to the center, or outer hole as the case may be, and the hinge lengthened.

If it be desired to harrow along the ridge or row, the weights 10 are shifted to the outer sides of the sections A and B respectively, weighting down the outer edges of the harrow and causing the same to hug the ridge. If the harrow is to be used in the valley between the rows, the weights are shifted to a position near the inner sides of the sections A and B, thus weighting the center heaviest and causing the center of the harrow to be depressed into the furrows. For harrowing on level ground, the weights are shifted to a position near the centers of the respective sections, thus more or less evenly distributing the weight and causing the harrow to ride level.

13 are U bolts and 14 are chains attached by the U bolts to the front ends of the sections A and B respectively to provide means for pulling the harrow.

Having now fully described my invention, what I claim and desire to secure by Letters Patent of the United States is:—

1. A harrow comprising rectangular sections each having parallel sides and parallel ends assembled into an integral whole and having a plurality of parallel diagonal interior members integral with said side and end members, and a plurality of spaced teeth secured to said members.

2. A harrow comprising two sections hinged together and a weight for each of said sections, each section being provided with a plurality of teeth secured in staggered relation, except that certain teeth are displaced whereby a longitudinal space is provided between the teeth adjacent each edge and along substantially the longitudinal center of each section whereby said weights may each be positioned optionally in one of three locations only on its harrow section.

3. A harrow comprising two sections, hinged together each section comprising a rigid rectangular frame having ends, an inner side member and an outer side member, one of the end members of each of said frames extending laterally inward past the inner side member of the same frame and being provided in said extension with a plurality of holes, the opposite end members extending inward past the same inner side member a lesser distance and being provided with a single hole, the two sections being assembled one with the longer extension forward and the other with the shorter extension forward, the longer extensions overlapping the outside of the shorter extensions, each shorter and longer extension being connected in pairs by removable bolts, whereby said sections may be hinged together, and provision be made for adjusting the width of the said harrow.

In testimony whereof I have hereunto set my name.

LEONIDAS C. HOLLOMAN.